(12) United States Patent
Nakamura et al.

(10) Patent No.: US 9,661,061 B2
(45) Date of Patent: May 23, 2017

(54) INFORMATION PROCESSING APPARATUS, REMOTE CONTROL COMMUNICATION DEVICE, AND CONTROL METHOD

(75) Inventors: Yosuke Nakamura, Kawasaki (JP); Koichi Yasaki, Kawasaki (JP); Kazuaki Nimura, Kawasaki (JP); Hidenobu Ito, Kawasaki (JP); Zhaogong Guo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1166 days.

(21) Appl. No.: 13/424,859

(22) Filed: Mar. 20, 2012

(65) Prior Publication Data
US 2012/0254281 A1    Oct. 4, 2012

(30) Foreign Application Priority Data
Mar. 29, 2011 (JP) .................................. 2011-073386

(51) Int. Cl.
*G06F 15/16* (2006.01)
*H04L 29/08* (2006.01)
(52) U.S. Cl.
CPC ................................. *H04L 67/025* (2013.01)
(58) Field of Classification Search
USPC ........................................................ 709/219
See application file for complete search history.

(56) References Cited

U.S. PATENT DOCUMENTS

| 6,084,911 | A | * | 7/2000 | Ishikawa | G10L 19/00 348/14.13 |
| 6,397,282 | B1 | * | 5/2002 | Hashimoto | H04L 29/06027 709/207 |
| 8,331,922 | B2 | * | 12/2012 | Grushkevich | H04M 1/72527 455/418 |
| 2005/0193390 | A1 | * | 9/2005 | Suzuki | G06F 8/65 717/178 |
| 2010/0137035 | A1 | * | 6/2010 | Shan | G06F 1/3293 455/566 |
| 2012/0057572 | A1 | * | 3/2012 | Evans | H04W 88/085 370/338 |

(Continued)

FOREIGN PATENT DOCUMENTS

JP    2005-165697    6/2005

*Primary Examiner* — Kristie Shingles
*Assistant Examiner* — Mohammad Yousuf A Mian
(74) *Attorney, Agent, or Firm* — Staas & Halsey LLP (57) ABSTRACT

There is provided an information processing apparatus including: an operating system (OS) processor configured to process information by using an OS; and a remote control communication device configured to operate independently from the OS, the remote control communication device including: communication module configured to receive data from an external network, a storage module configured to store therein the reception data received by the communication module, a communication controller configured to transmit, to the OS processor, the reception data received by the communication module and control the storage module so that the storage module stores therein the reception data, an extract module configured to extract, from the reception data stored in the storage module, remote-control data to be processed in the remote control communication device, and a processor configured to control the OS processor, based on the remote-control data extracted by the extract module.

8 Claims, 8 Drawing Sheets

(56) References Cited

U.S. PATENT DOCUMENTS

2012/0182859 A1* 7/2012 Ikeda .................... H04L 1/1835
  370/216
2013/0265940 A1* 10/2013 Su ....................... H04L 67/2861
  370/328

* cited by examiner

INFORMATION PROCESSING APPARATUS, REMOTE CONTROL COMMUNICATION DEVICE, AND CONTROL METHOD

CROSS-REFERENCE TO RELATED APPLICATION

This application is based upon and claims the benefit of priority of the prior Japanese Patent Application No. 2011-073386, filed on Mar. 29, 2011, the entire contents of which are incorporated herein by reference.

FIELD

The embodiments discussed herein are related to an information processing apparatus, a remote control communication device, and a control method to control a remote control communication device.

BACKGROUND

In recent years, there have been prevailed push-type data distribution services that distribute information from servers to terminal devices. Such a service is called a push service, and is a service in which, regardless of the state of the power-on and power-off of a terminal device or the presence or absence of the network connection of the terminal device, when information is distributed from a server to the terminal device, it possible for the terminal device to automatically receive the information.

For example, the number of persons having portable terminal devices such as notebook computers, personal digital assistants (PDAs), and the like has increased. Owing to the prevalence of such portable terminal devices, there have grown risks such as a confidential information leak and the like, associated with the theft or loss of a portable terminal device used for work. In particular, owing to the revision of the Personal Information Protection Law or the like, a corporate risk for the confidential information leak has been further increased. Therefore, there has grown a request that an administrator of the information system of a company manages portable terminal devices used by employees, at any time and from anywhere. Upon receiving such a request, a service has been provided in which it is possible to erase the encryption key of an encrypted hard disk drive (HDD) embedded in a portable terminal device, on the basis of an instruction from a remote location. Accordingly, it may be possible to avoid an information leak from a portable terminal device due to the theft or loss thereof. Such a service as described above is an example of the push service.

In addition, in the case of the portable terminal device, since the portable terminal device is not continuously connected to a network, there has been considered providing a portable terminal device with data due to the push service, using a mobile communication network such as a third Generation (3G) network or the like.

In order to receive such a push service, within the portable terminal device, a remote control communication device is provided that is able to operate independently from the portable terminal device establishing communication with the mobile communication network. An example of such a technique is disclosed in Japanese Laid-open Patent Publication No. 2005-165697.

SUMMARY

According to an aspect of the embodiment, there is provided an information processing apparatus including: an operating system (OS) processor configured to process information by using an OS; and a remote control communication device configured to operate independently from the OS, the remote control communication device including: communication module configured to receive data from an external network, a storage module configured to store therein the reception data received by the communication module, a communication controller configured to transmit, to the OS processor, the reception data received by the communication module and control the storage module so that the storage module stores therein the reception data, an extract module configured to extract, from the reception data stored in the storage module, remote-control data to be processed in the remote control communication device, and a processor configured to control the OS processor, based on the remote-control data extracted by the extract module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of an information processing apparatus, a remote control communication device and a control method to control the remote control communication device, disclosed in the present application, will be described in detail on the basis of drawings. In addition, the information processing apparatus, the remote control communication device and the control method to control the remote control communication device, disclosed in the present application, are not limited owing to the following embodiments.

First Embodiment

Figure 1:
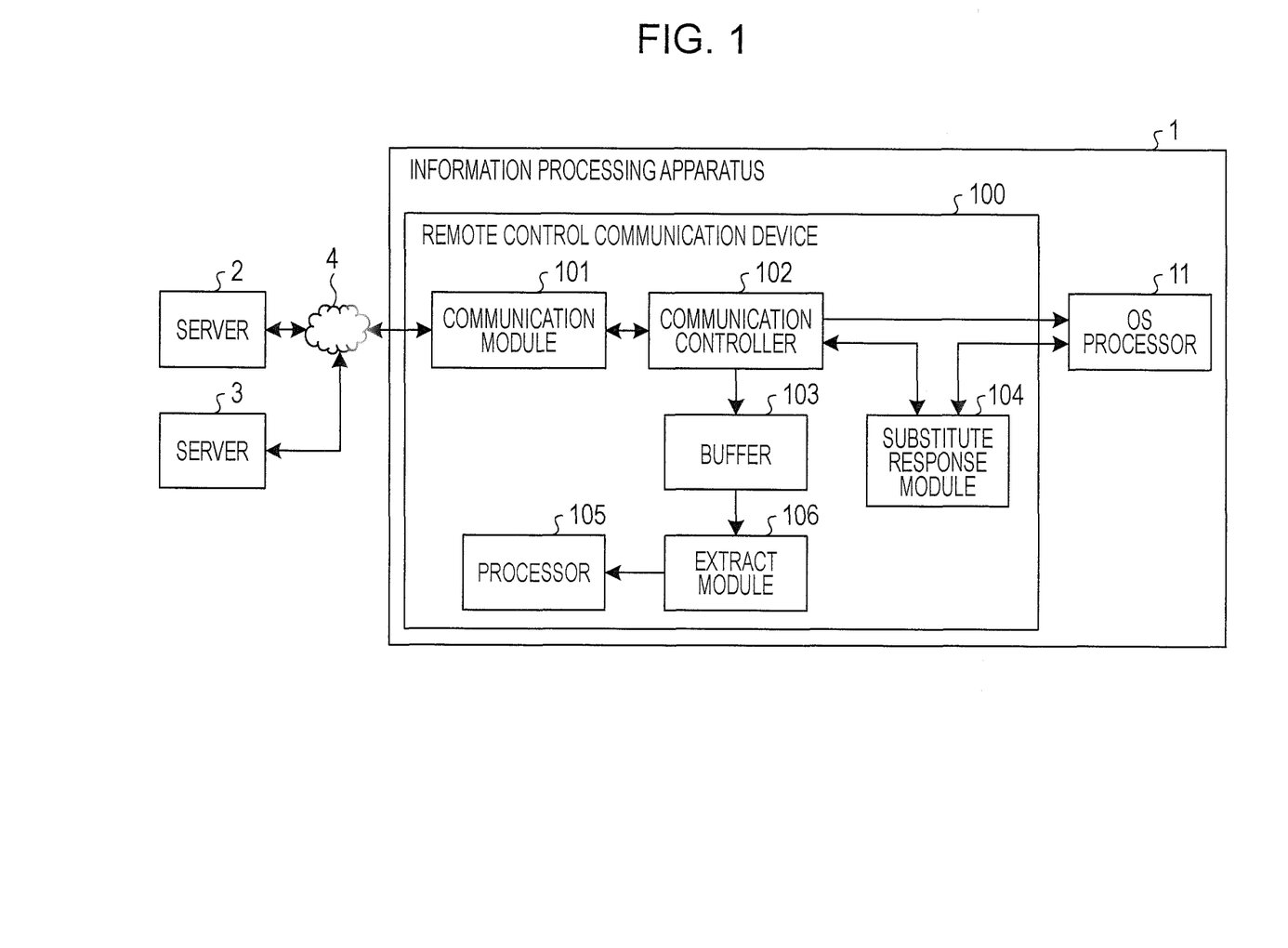
FIG. 1 is a block diagram of an information processing apparatus according to a first embodiment.

FIG. 1 is the block diagram of an information processing apparatus according to a first embodiment. As illustrated in FIG. 1, an information processing apparatus 1 according to the present embodiment is connected a server 2 and a server 3 through a 3G network 4. In addition, the information processing apparatus 1, the server 2, and the server 3 are capable of transmitting and receiving data to and from one another through the 3G network 4. Here, the information processing apparatus 1 is a portable personal computer or the like, for example.

The server 2 transmits remote-control data used for controlling the information processing apparatus 1 using a remote control communication device 100, independently from the OS of the information processing apparatus 1. This remote-control data is transmitted to be addressed to the remote control communication device 100 for the last time. In addition, the server 3 transmits application data that is data to be processed by the OS of the information processing apparatus 1. This application data is transmitted to be addressed to the OS processor 11.

The information processing apparatus 1 includes a remote control communication device 100 and an OS processor 11. The OS processor 11 includes the OS.

The OS processor 11 receives the remote-control data and the application data from a communication controller 102 described later. Next, the OS processor 11 analyzes the received remote-control data and the received application data, and extracts the application data. In addition, the OS processor 11 processes the extracted application data, using the OS. Here, the processing of the application data may be processing available for the OS to execute, and there is not a limit on the processing. Examples of the processing of the application data include the transmission and reception of a mail, the update of a database, the provision of information, and the like.

In addition, the OS processor 11 receives communication information input from a substitute response module 104 described later. Here, the communication information is information desirable for performing communication, and includes the address of a Domain Name Service (DNS) server, the parameter of a packet size used for transmission, and the like, for example. In addition, the OS processor 11 transmits data to the substitute response module 104 along with a transmission destination address, using the received communication information.

The remote control communication device 100 includes a communication module 101, a communication controller 102, a buffer 103, the substitute response module 104, a processor 105, and an extract module 106. Here, in the present embodiment, a case will be described in which the remote control communication device 100 performs communication using a 3G communication module connected through a Universal Serial Bus (USB) interface.

In the present embodiment, the communication module 101 includes the 3G communication module connected through the USB interface. In addition, the communication module 101 receives data from the server 2 and the server 3 through the 3G network 4. Here, in a case in which the server 3 has transmitted the application data to the information processing apparatus 1 when the server 2 has transmitted the remote-control data to the information processing apparatus 1, the communication module 101 receives data in which the remote-control data and the application data are mixed. This is because, since each data is transmitted with being segmentalized and packaged, individual pieces of segmentalized data are mixed together. Hereinafter, the data in which the remote-control data and the application data are mixed is referred to as "mixed data". In addition, in the present embodiment, the communication module 101 converts the received mixed data into the data format of a USB. In addition, the communication module 101 outputs, to the communication controller 102, the mixed data whose data format is converted.

In addition, the communication module 101 receives, from the communication controller 102, data to be transmitted to the server 2 or the server 3. In addition, the communication module 101 transmits the data to the server 2 or the server 3, designated by the communication controller 102, through the 3G network 4.

The communication controller 102 transmits a command for a network connection request to the server 2 and the server 3 at the time of the power activation of the information processing apparatus 1. In addition, when a connection has been terminated, the communication controller 102 transmits the command for a network connection request again. In addition, when having received responses from the server 2 and the server 3, the communication controller 102 establishes connection with the server 2 and the server 3 through the 3G network 4. In addition, the communication controller 102 recognizes the 3G communication module included in the communication module 101 as a USB Communication Device Class (CDC), and controls the 3G communication module as a modem. Therefore, the communication controller 102 makes a communication connection request using an AT command that is the control command of the modem.

Furthermore, the communication controller 102 receives, from the substitute response module 104, a network connection request from the OS processor 11. In addition, for example, the communication controller 102 outputs, to the substitute response module 104, communication information including the address of the DNS server in the connection established between the server 2 and the server 3, as a response to the received network connection request.

In addition, the communication controller 102 receives the mixed data input from the communication module 101. In addition, the communication controller 102 stores the received mixed data in the buffer 103. In addition, the communication controller 102 outputs the received mixed data to the OS processor 11. For example, in the present embodiment, the communication controller 102 transmits the mixed data to the OS processor 11 through a USB device driver.

In addition, the communication controller 102 receives, from the substitute response module 104, data and the address of the transmission destination of the data, transmitted by the OS processor 11. In addition, the communication controller 102 outputs, to the communication module 101, the data and the address of the transmission destination, received.

The substitute response module 104 receives a network connection request from the OS processor 11. The AT command is also used for this network connection. Actually, for example, a USB driver receives the AT command output by the OS processor 11. At this time, the USB driver does not make a call request to a number designated by the AT command. In addition, processing is performed in which that USB driver outputs the received AT command to the substitute response module 104.

The substitute response module 104 outputs the received network connection request to the communication controller 102. Furthermore, the substitute response module 104 receives, from the communication controller 102, communication information as the response of the network connection request. Specifically, it may be possible to realize sharing of information between the communication controller 102 and the substitute response module 104 on the basis of interprocess communication utilizing packet communication, a shared memory, and the like. In addition, the substitute response module 104 outputs, to the OS processor 11, the received communication information as a response to the network connection request. Accordingly, the substitute response module 104 makes it appear to the OS processor 11 as though a network connection has been established owing to the network connection request. Namely, while, actually, network connections are established among the remote control communication device 100, the server 2, and the server 3, the OS processor 11 understands that network connections are established among the self, the server 2, and the server 3.

The substitute response module 104 receives the communication information input from the communication controller 102. In addition, the substitute response module 104 outputs the received communication information to the OS processor 11.

The buffer 103 is a storage device such as a memory or the like. Upon receiving an instruction from the communication controller 102, the buffer 103 stores therein the mixed data. This buffer corresponds to an example of a "storage module".

The extract module 106 acquires the mixed data stored in the buffer 103. In the present embodiment, the extract module 106 extracts remote-control data addressed to the remote control communication device 100, from the acquired mixed data.

Figure 2:
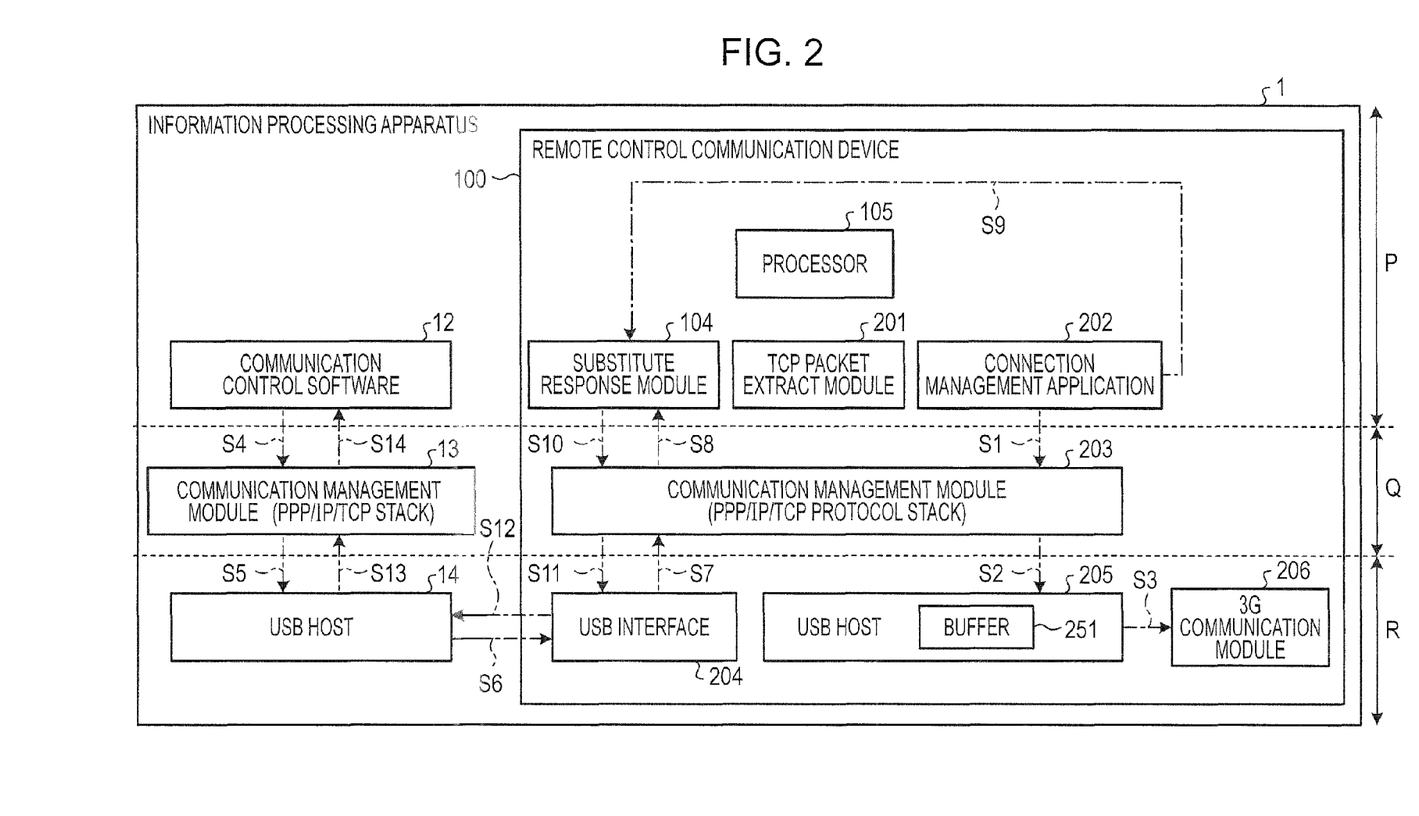
FIG. 2 is a block diagram illustrating functions of the information processing apparatus according to the first embodiment so that the functions correspond to individual layers of an OSI reference model.

Here, the extraction of the remote-control data from the mixed data, performed by the extract module 106, will be specifically described with reference to with FIG. 2. FIG. 2 is a block diagram illustrating the functions of the information processing apparatus according to the first embodiment so that the functions correspond to the individual layers of an OSI reference model. A range R in FIG. 2 indicates a physical layer. In addition, a range Q indicates a data link layer, a network layer, and a transport layer. In addition, a range P indicates a session layer, a presentation layer, and an application layer. Here, in FIG. 2, lines illustrating connection relationships between the individual functional modules are omitted.

The extract module 106 corresponds to the functions of portions of a TCP (Transmission Control Protocol) packet extract module 201 and a communication management module 203. In addition, the communication controller 102 corresponds to a connection management application 202, the function of a portion of the communication management module 203, and the function of a portion of a USB host 205. In addition, the OS processor 11 corresponds to communication control software 12, a communication management module 13, and a USB host 14. In addition, the communication module 101 corresponds to a 3G communication module 206. In addition, it is assumed that, in FIG. 2, each module having the same symbol as in FIG. 1 has the same function.

In the present embodiment, it is assumed that the extraction of data is performed in a TCP level and packets having a specific port number are only extracted. Namely, data addressed to the remote control communication device 100 is data transmitted to be addressed to the specific port number.

The TCP packet extract module 201 requests the communication management module 203 to acquire a packet. The communication management module 203 includes a TCP protocol stack, an IP protocol stack, and a PPP protocol stack. Upon receiving a request for the acquisition of a packet, the TCP protocol stack requests the IP protocol stack to acquire a TCP packet. Upon receiving this, the IP protocol stack requests the PPP protocol stack to acquire an IP packet. Upon receiving this, the PPP protocol stack acquires a PPP packet designated by the buffer 251. In addition, the PPP protocol stack solves and puts the packaging of the PPP packet into an IP packet. In addition, the PPP protocol stack outputs the IP packet to the IP protocol stack. The IP protocol stack solves and puts the packaging of the IP packet received from the PPP protocol stack, into a TCP packet. In addition, the IP protocol stack outputs the TCP packet to the TCP protocol stack. The TCP protocol stack preliminarily stores therein the specific port number used for communication addressed to the remote control communication device 100. For example, with respect to the storing of this port number, the port number may be preliminarily written into a ROM, or a method may be adopted in which the port number is put into a PRM and preserved in a rewritable state. The TCP protocol stack refers to the transmission port number of the header of the acquired TCP packet, and extracts the packet of the port number designated as the communication addressed to the remote control communication device 100. Accordingly, it may be possible for the TCP protocol stack to extract the remote-control data from the mixed data. In addition, the TCP protocol stack outputs the extracted packet to the TCP packet extract module 201.

Here, for example, when the TCP protocol stack does not have a function for extracting a packet addressed to a specific port number, another application located within the range P may also receive the TCP packet and extract data addressed to a designated port number.

In this way, it may be possible for the extract module 106 to extract, from the mixed data, the remote-control data addressed to the remote control communication device 100.

The extract module 106 outputs, to the processor 105, the extracted remote-control data addressed to the remote control communication device 100 and transmitted from the server 2.

The processor 105 receives the remote-control data addressed to the remote control communication device 100, transmitted from the server 2 and input from the extract module 106. In addition, the processor 105 performs processing corresponding to the received data. For example, when the received remote-control data is an erasing instruction for a hard disk, the processor 105 sends out, to the OS processor 11, an instruction for executing erasing data of the hard disk of the information processing apparatus 1. For example, the processor 105 powers on the OS processor 11, and causes the OS processor 11 to execute a hard disk erasing program incorporated in a BIOS. The remote-control data includes data indicating an instruction for causing the OS processor 11 to process an instruction that the remote control communication device 100 is able to execute in the BIOS. This instruction includes processing that is able to be executed without activating an OS such as remote desktop processing, called an active management technology, or the like.

Next, with reference to FIG. 2, processing for establishing connection with an external network will be described that is performed by the remote control communication device 100 and the OS processor 11. Here, in FIG. 2, the flow of data in the processing for establishing connection with the external network is indicated by arrows of dashed-dotted lines. Operations S1-S14 indicate the flow of data related to each operation.

First, when the information processing apparatus 1 is powered on, the connection management application 202 outputs an AT command making a connection request for communication, to the communication management module 203 (Operation S1). Therefore, the communication management module 203 outputs the received AT command to the USB host 205 (Operation S2). In addition, the USB host 205 outputs the received AT command to the 3G communication module 206 (Operation S3). The 3G communication module 206 makes a call request to the server using the AT command. After this, upon receiving a response from the server, the connection management application 202, the communication management module 203, and the 3G communication module 206 establish connection with the server. At this time, the connection management application 202 has held communication information.

Next, the communication control software 12 outputs, to the communication management module 13, a connection request utilizing the AT command (Operation S4). Therefore, the communication management module 13 outputs the received AT command to the USB host 14 (Operation S5). The USB host 14 outputs the received AT command to the USB interface 204 (Operation S6).

In addition, the USB interface 204 output the AT command received from the USB host 14, to the communication management module 203 (Operation S7). In this case, the USB interface 204 does not directly transmit the AT command to the USB host 205 and cause the USB host 205 to make a call request to a connection destination. The communication management module 203 outputs the AT command to the substitute response module 104 (Operation S8).

The substitute response module 104 acquires the communication information held in the connection management application 202, from the connection management application 202 (Operation S9).

The substitute response module 104 outputs the communication information acquired from the connection management application 202, to the communication management module 203 (Operation S10). In addition, the communication management module 203 outputs the received communication information, to the USB interface 204 (Operation S11).

The USB interface 204 outputs the communication information acquired from the connection management application 202, to the USB host 14 (Operation S12). The USB host 14 outputs the received communication information to the communication management module 13 (Operation S13). In addition, the communication management module 13 outputs the received communication information to the communication control software 12 (Operation S14). In addition, the communication control software 12 stores the received communication information. After that, the communication control software 12 performs communication using the stored communication information. By establishing a connection in this way, while actually establishing a connection with the external network through the remote control communication device 100, it is possible for the OS processor 11 to act as if the OS processor 11 is directly connected to the network.

Figure 3:
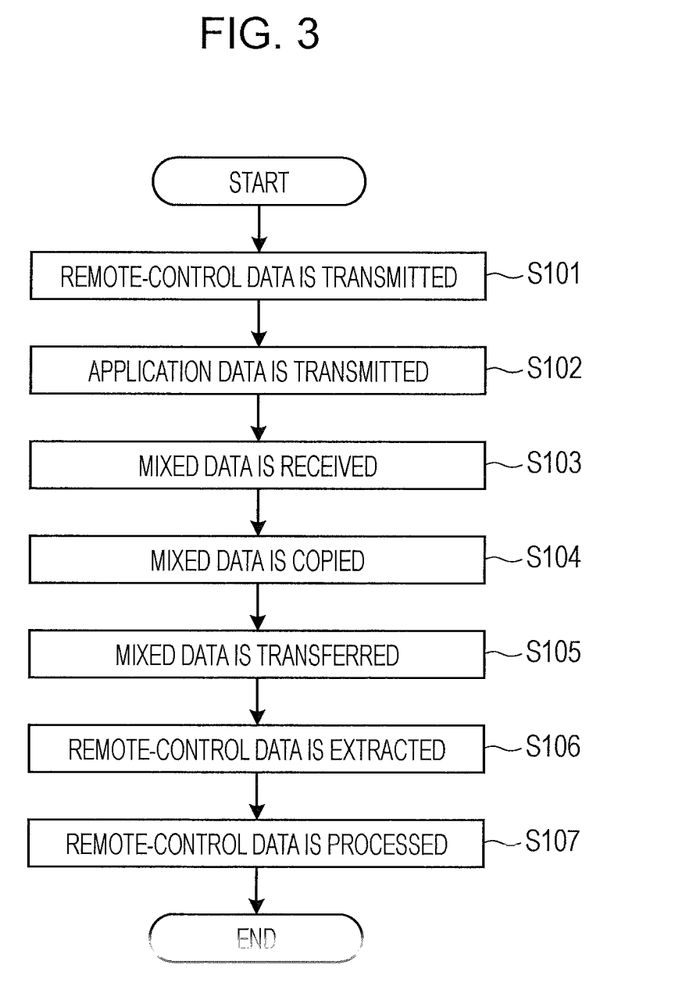
FIG. 3 is a flowchart of data reception processing of the information processing apparatus according to the first embodiment.

Next, the flow of the data reception processing of the information processing apparatus 1 according to the present embodiment will be described with reference to FIG. 3. FIG. 3 is the flowchart of the data reception processing of the information processing apparatus according to the first embodiment.

The server 2 transmits the remote-control data to be addressed to the remote control communication device 100 (Operation S101). In addition, the server 3 transmits the application data to be addressed to the OS processor 11 (Operation S102). Here, while, for convenience of description, the Operation S101 and the Operation S102 are described so as to be sequentially processed, actually the Operation S101 and the Operation S102 are processed in parallel.

The communication module 101 receives the mixed data in which the remote-control data and the application data are mixed (Operation S103). In addition, the communication module 101 outputs the received mixed data to the communication controller 102.

The communication controller 102 receives the mixed data input from the communication module 101. In addition, the communication controller 102 copies and stores the mixed data in the buffer 103 (Operation S104). Furthermore, the communication controller 102 transfers the mixed data to the OS processor 11 (Operation S105). The OS processor 11 extracts data addressed to the self, from the received mixed data, and performs processing on the extracted data.

In addition, the extract module 106 acquires the mixed data stored in the buffer 103. In addition, the extract module 106 extracts the remote-control data from the acquired mixed data (Operation S106). The extract module 106 outputs the extracted remote-control data to the processor 105.

The processor 105 receives the remote-control data input from the extract module 106. In addition, the processor 105 processes the remote-control data (Operation S107).

As described above, in the information processing apparatus according to the present embodiment, the remote control communication device provided in the inside thereof stores therein and transfers the received mixed data to the OS. In addition, the remote communication device relays transmission data from the OS. Therefore, the OS and the external network are connected to each other in a pseudo manner, and caused to be able to communicate with each other. Accordingly, it may also be possible for the OS of a portable terminal device to use a communication network, used for a push service, for communication. Furthermore, since the mixed data is transferred to the OS with no change, it may be possible to maintain the property of real-time in the communication of the OS. In other words, it may be possible to establish communication between the OS and the external network without causing an undesired delay to occur in the communication.

Second Embodiment

Figure 4:
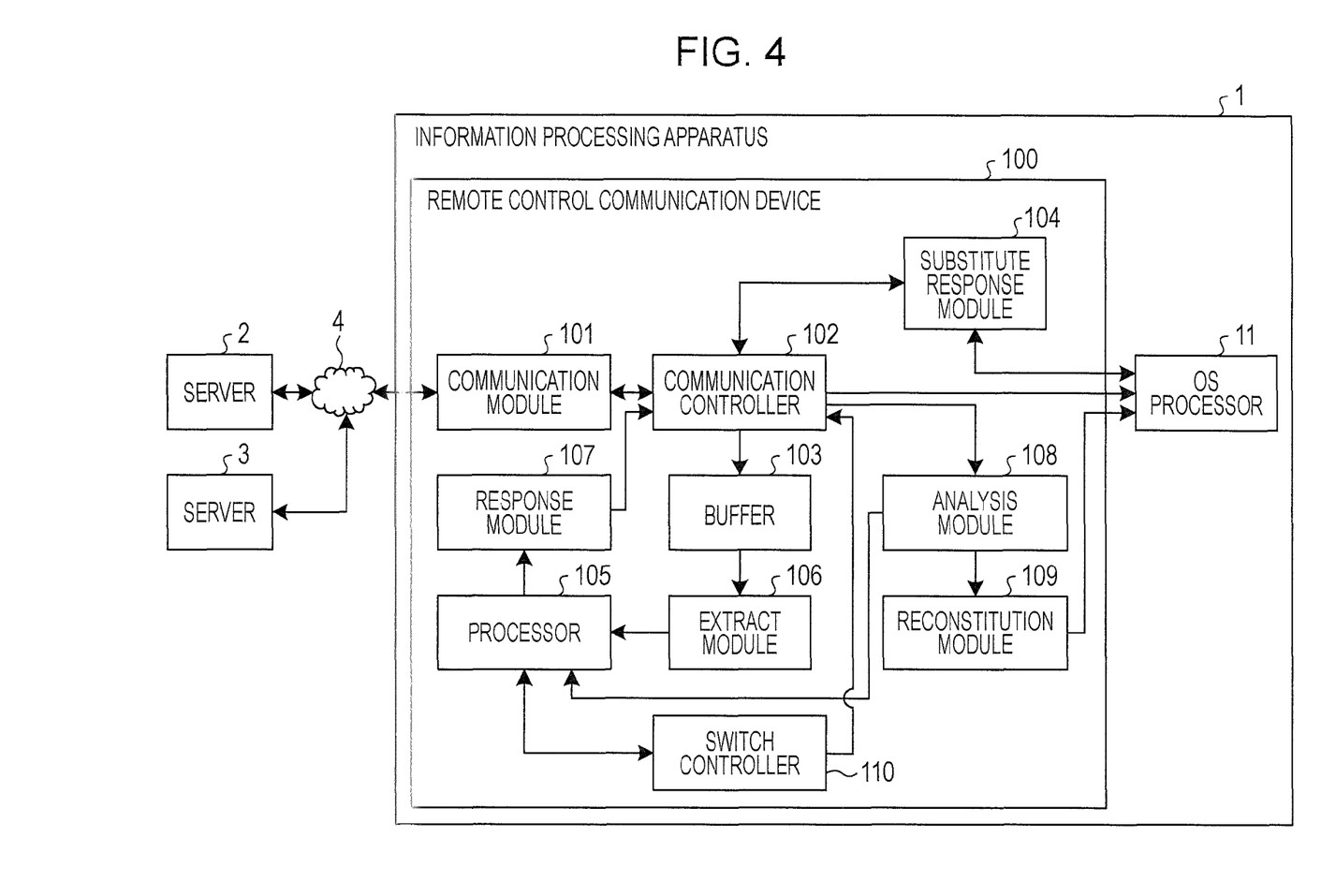
FIG. 4 is a block diagram of an information processing apparatus according to a second embodiment.

FIG. 4 is the block diagram of an information processing apparatus according to a second embodiment. An information processing apparatus 1 according to the present embodiment differs from the first embodiment in that, in addition to the function of the mixed data processing of the first embodiment, a function of performing processing for separating the mixed data into the application data and the remote-control data in the remote control communication device 100 is included and one of the processing operations is selected and executed. Therefore, hereinafter, the selection of the processing for separating the mixed data and the processing for the mixed data, performed in the remote control communication device 100, will be mainly described. It is assumed that, in FIG. 4, each module having the same symbol as in FIG. 1 has the same function as long as there is no specific description.

As illustrated in FIG. 4, a response module 107, an analysis module 108, a reconstitution module 109, and a switch controller 110 are added to the information processing apparatus 1 in FIG. 1, and hence the information processing apparatus 1 according to the present embodiment is obtained.

Individual modules will be described that perform the processing for separating the mixed data into the application data and the remote-control data in the remote control communication device 100.

The analysis module 108 preliminarily stores therein the port number of a specific port used for communication with the remote control communication device 100.

The analysis module 108 receives the input of the mixed data from the communication controller 102. In addition, for example, the analysis module 108 solves the packaging of the received mixed data until the mixed data is put into TCP packets.

Figure 5:
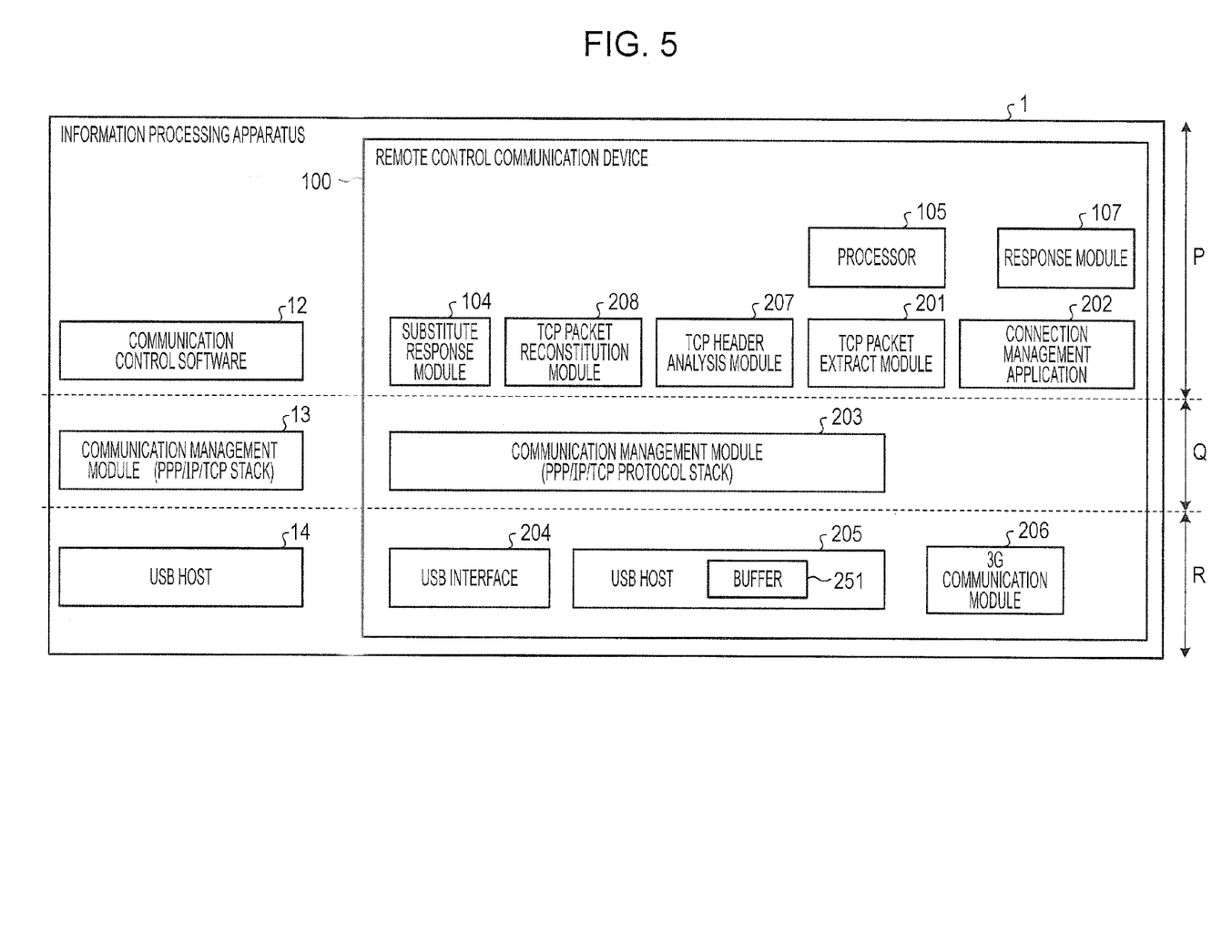
FIG. 5 is a block diagram illustrating functions of the information processing apparatus according to the second embodiment so that the functions correspond to individual layers of the OSI reference model.

Here, with reference to FIG. 5, the processing for solving the packaging of the mixed data and the identification processing for the remote-control data, performed by the analysis module 108, will be specifically described. FIG. 5 is a block diagram illustrating the functions of the information processing apparatus according to the second embodiment so that the functions correspond to the individual layers of the OSI reference model. A range R in FIG. 5 indicates the physical layer. In addition, a range Q indicates the data link layer, the network layer, and the transport layer. In addition, a range P indicates the session layer, the presentation layer, and the application layer. Here, in FIG. 5, lines illustrating flows of data between the individual functional modules are omitted. In addition, it is assumed that, in FIG. 5, each module having the same symbol as in FIG. 2 has the same function.

The analysis module 108 corresponds to the functions of portions of a TCP header analysis module 207 and the communication management module 203. In addition, the reconstitution module 109 corresponds to the functions of portions of a TCP packet reconstitution module 208 and the communication management module 203.

The TCP header analysis module 207 requests the communication management module 203 to acquire a packet. The communication management module 203 includes the TCP protocol stack, the IP protocol stack, and the PPP protocol stack. Upon receiving a request for the acquisition of a packet, the TCP protocol stack requests the IP protocol stack to acquire a TCP packet. Upon receiving this, the IP protocol stack requests the PPP protocol stack to acquire an IP packet. Upon receiving this, the PPP protocol stack acquires a PPP packet designated by the buffer 251. In addition, the PPP protocol stack solves and puts the packaging of the PPP packet into an IP packet. In addition, the PPP protocol stack outputs the IP packet to the IP protocol stack. The IP protocol stack solves and puts the packaging of the IP packet received from the PPP protocol stack, into a TCP packet. In addition, the IP protocol stack outputs the TCP packet to the TCP protocol stack. The TCP protocol stack preliminarily stores therein the specific port number used for communication addressed to the remote control communication device 100. The TCP protocol stack refers to the transmission port number of the header of the acquired TCP packet, and extracts the packet of a port number designated as the communication addressed to the remote control communication device 100. Accordingly, it may be possible for the TCP protocol stack to extract the remote-control data from the mixed data. In addition, the TCP protocol stack outputs the extracted packet to the TCP header analysis module 207.

In this way, the analysis module 108 confirms the header of the TCP packet, and acquires, as the remote-control data, data transmitted to be addressed to a port used for communication with the remote control communication device 100. In addition, the analysis module 108 acquires, as the application data, data other than the data transmitted to be addressed to the port used for communication with the remote control communication device 100.

In addition, the analysis module 108 outputs the acquired remote-control data to the processor 105. In addition, the analysis module 108 outputs the acquired application data to the reconstitution module 109.

The reconstitution module 109 receives the input of the application data from the analysis module 108. In addition, the reconstitution module 109 reconstitutes the application data so that the application data is compatible with the communication format of the OS processor 11, namely, in the present embodiment, by packaging the application data so that the application data becomes compatible with the USB format. At this time, for example, by recalculating and rewriting the checksum of a TCP header, the reconstitution module 109 may perform processing so that no inconvenience occurs as a TCP packet.

Here, the reconstitution processing performed by the reconstitution module 109 according to the present embodiment will be specifically described with reference to FIG. 5. The TCP packet reconstitution module 208 recalculates and rewrites the checksum of the TCP header, and reconstitutes the TCP packet. In addition, the TCP packet reconstitution module 208 outputs the reconstituted TCP packet to the communication management module 203. The communication management module 203 performs packaging on the received TCP packet using each protocol stack, and reconstitutes the application data so that the application data becomes compatible with the USB format able to be transmitted to the OS processor 11. In addition, the communication management module 203 outputs the reconstituted application data to the TCP packet reconstitution module 208. In such a way as described above, the reconstitution module 109 performs the reconstitution of the application data.

In addition, the reconstitution module 109 outputs the reconstituted application data to the OS processor 11 through the communication controller 102.

The OS processor 11 solves the packaging of the application data received using each protocol stack. After that, the OS processor 11 processes the application data.

By separating the received mixed data into the remote-control data and the application data in such a way as described above, it may be possible to transmit only the application data to the OS processor 11. Namely, it may be possible to avoid transmitting the remote-control data to the OS processor 11. For example, when the content of an erasing instruction for a hard disk, the security policy setting instruction of a PC, or the like, transmitted to be addressed to the remote control communication device 100, is analyzed on the OS, a problem may occur. Specifically, when such an instruction is transmitted to the OS, a command format may become apparent. Therefore, there may occur a problem that shakes security, for example, an instruction may be issued from a person other than a legitimate transmitter. Therefore, by avoiding the transmission of such an instruction to the OS, it may be possible to strengthen security.

Next, the switching of processing, performed on the received mixed data, will be described. Hereinafter, a processing method for storing the received mixed data in the buffer 103 is referred to as a "copy method", and processing for separating and transmitting the application data from the received mixed data to the OS processor 11 is referred to as an "analysis method".

When the switching is performed, the operator of the server 2 performing the push service transmits a switch instruction to the information processing apparatus 1. For example, when important remote-control data is sent in a state in which the information processing apparatus 1 executes the copy method, before that, the operator of the server 2 causes an execution instruction for the analysis method to be transmitted from the server 2 to the information processing apparatus 1. In addition, when having received the notification of the completion of switching to the analysis method, from the information processing apparatus 1, the operator of the server 2 transmits the remote-control data from the server 2 to the information processing apparatus 1. In addition, for example, when a request for switching to the copy method occurs in a state in which the information processing apparatus 1 executes the analysis method, the operator of the server 2 causes an execution instruction for the copy method to be transmitted from the server 2 to the information processing apparatus 1.

When the information processing apparatus 1 has been powered on, the switch controller 110 instructs the communication controller 102 to store data in the buffer 103, and causes the communication controller 102 to select the copy method as processing for the mixed data.

In addition, when an instruction for switching to the analysis method has been transmitted from the server 2 in a state in which the processing of the copy method is executed, the switch controller 110 receives, from the processor 105, an instruction for switching processing for the mixed data to the analysis method. In addition, the switch controller 110 instructs the communication controller 102 to output the mixed data to the analysis module 108, and causes the communication controller 102 to switch the processing method. When switching to the analysis method has been completed, the switch controller 110 transmits the notification of the completion of the switching, to the processor 105.

In addition, when an instruction for switching to the copy method has been transmitted from the server 2 in a state in which the processing of the analysis method is executed, the switch controller 110 receives, from the processor 105, an instruction for switching processing for the mixed data to the copy method. In addition, the switch controller 110 instructs the communication controller 102 to store data in the buffer 103, and causes the communication controller 102 to switch the processing method. When the notification of switching to the copy method has been completed, the switch controller 110 transmits the notification of the completion of the switching, to the processor 105.

Here, in the present embodiment, a route to the buffer 103 and a route to the analysis module 108 are separated in a hardware manner using a switch, and the switch is changed over, thereby realizing the method for switching between the copy method and the analysis method. In this regard, however, as the switching method, another method may also be adopted, and for example, a method may also be adopted that switches between modules separately operating for the extract module 106 and the analysis module 108, as software modules, or a method may also be adopted in which one software module is used and the operation thereof is internally switched.

When performing the processing of the copy method, the processor 105 receives the remote-control data input from the extract module 106. In addition, the processor 105 determines whether or not the received remote-control data is an instruction for switching to the analysis method. When the received remote-control data is not an instruction for switching to the analysis method, the processor 105 performs usual processing on the remote-control data. Here, for example, the usual processing is processing such as the erasing of a hard disk or the like, performed on the information processing apparatus 1 other than the remote control communication device 100. On the other hand, when the received remote-control data is an instruction for switching to the analysis method, the processor 105 determines whether or not all the processing of the remote-control data received before the reception of the instruction. When there is remote-control data the processing of which has not been completed, the processor 105 performs the processing of the remote-control data the processing of which has not been completed. In addition, when the processing of all the remote-control data has been completed, the processor 105 notifies the switch controller 110 of an instruction for switching to the analysis method. After that, when having received, from the switch controller 110, the notification of the completion of the switching, the processor 105 transmits, to the response module 107, the notification of the completion of switching to the analysis method.

In addition, when performing the processing of the analysis method, the processor 105 receives the remote-control data input from the analysis module 108. In addition, the processor 105 determines whether or not the received remote-control data is an instruction for switching to the copy method. When the received remote-control data is not an instruction for switching to the copy method, the processor 105 performs usual processing on the remote-control data. Here, for example, the usual processing is processing such as the erasing of a hard disk or the like, performed on the information processing apparatus 1 other than the remote control communication device 100. On the other hand, when the received remote-control data is an instruction for switching to the copy method, the processor 105 determines whether or not all the processing of the remote-control data received before the reception of the instruction. When there is remote-control data the processing of which has not been completed, the processor 105 performs the processing of the remote-control data the processing of which has not been completed. In addition, when the processing of all the remote-control data has been completed, the processor 105 notifies the switch controller 110 of an instruction for switching to the copy method. After that, when having received, from the switch controller 110, the notification of the completion of the switching, the processor 105 transmits, to the response module 107, the notification of the completion of switching to the copy method.

The response module 107 receives the notification of the completion of switching to the analysis method, from the processor 105. In addition, the response module 107 notifies the server 2 of the completion of switching to the analysis method, through the communication controller 102 and the communication module 101.

In addition, the response module 107 receives the notification of the completion of switching to the copy method, from the processor 105. In addition, the response module 107 notifies the server 2 of the completion of switching to the copy method, through the communication controller 102 and the communication module 101.

Figure 6:
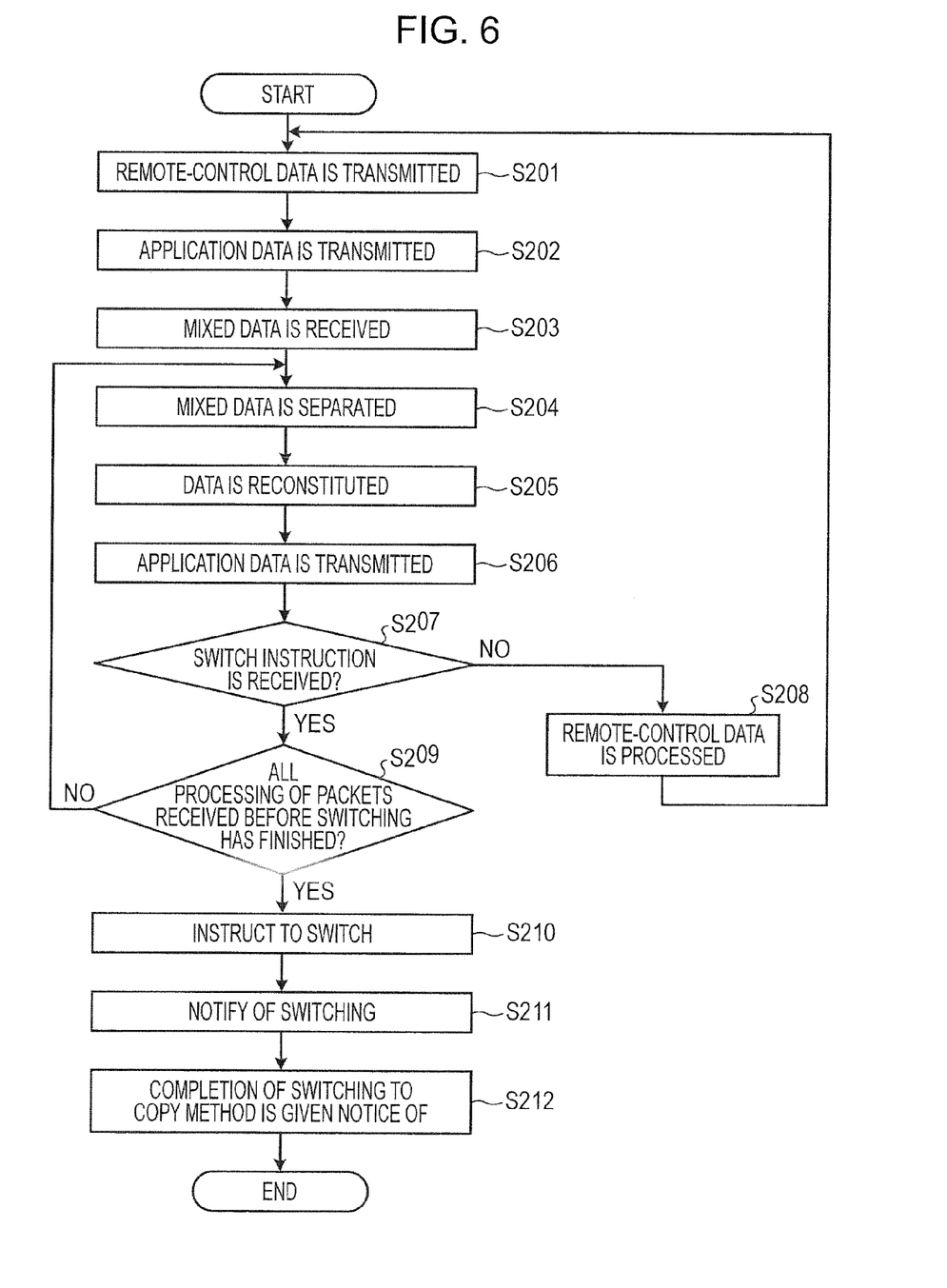
FIG. 6 is a flowchart illustrating processing of an analysis method and processing for switching from the analysis method to a copy method, performed in the information processing apparatus according to the second embodiment.

Next, with reference to FIG. 6, the flow of the processing of the analysis method and processing for switching from the analysis method to the copy method will be described that is performed in the information processing apparatus according to the present embodiment. FIG. 6 is a flowchart illustrating the processing of the analysis method and the processing for switching from the analysis method to the copy method, performed in the information processing apparatus according to the second embodiment.

The server 2 transmits the remote-control data to be addressed to the remote control communication device 100 (Operation S201). In addition, the server 3 transmits the application data to be addressed to the OS processor 11 (Operation S202). Here, while, for convenience of description, the Operation S201 and the Operation S202 are described so as to be sequentially processed, actually the Operation S201 and the Operation S202 are processed in parallel.

The communication module 101 receives the mixed data in which the remote-control data and the application data are mixed (Operation S203). In addition, the communication module 101 outputs the received mixed data to the communication controller 102. The communication controller 102 outputs the mixed data to the analysis module 108.

The analysis module 108 separates the received mixed data into the remote-control data and the application data (Operation S204). In addition, the analysis module 108 outputs the remote-control data to the processor 105, and outputs the application data to the reconstitution module 109.

The reconstitution module 109 receives the application data input from the analysis module 108. In addition, the reconstitution module 109 packages and reconstitutes the received application data so that the received application data becomes compatible with the USB format (Operation S205).

The reconstitution module 109 transmits the reconstituted application data to the OS processor 11 through the communication controller 102 (Operation S206).

The processor 105 receives the remote-control data input from the analysis module 108. In addition, the processor 105 determines whether or not the received remote-control data is a switch instruction (Operation S207). When the received remote-control data is not a switch instruction (Operation S207: negative), the processor 105 performs usual processing on the remote-control data (Operation S208), and returns to Operation S201.

On the other hand, when the received remote-control data is a switch instruction (Operation S207: affirmative), the processor 105 determines whether or not all the processing of packets received before switching has finished (Operation S209). When an unprocessed packet exists (Operation S209: negative), the processor 105 returns to Operation S204.

On the other hand, when all the processing of packets has finished (Operation S209: affirmative), the processor 105 instructs the switch controller 110 to perform switching (Operation S210).

The switch controller 110 notifies the communication controller 102 of switching from the analysis method to the copy method (Operation S211). When the switching has been completed, the switch controller 110 notifies the processor 105 of the completion of switching to the copy method. In addition, the processor 105 notifies the response module 107 of the completion of switching to the copy method.

The response module 107 notifies the server 2 of the completion of switching to the copy method (Operation S212).

Figure 7:
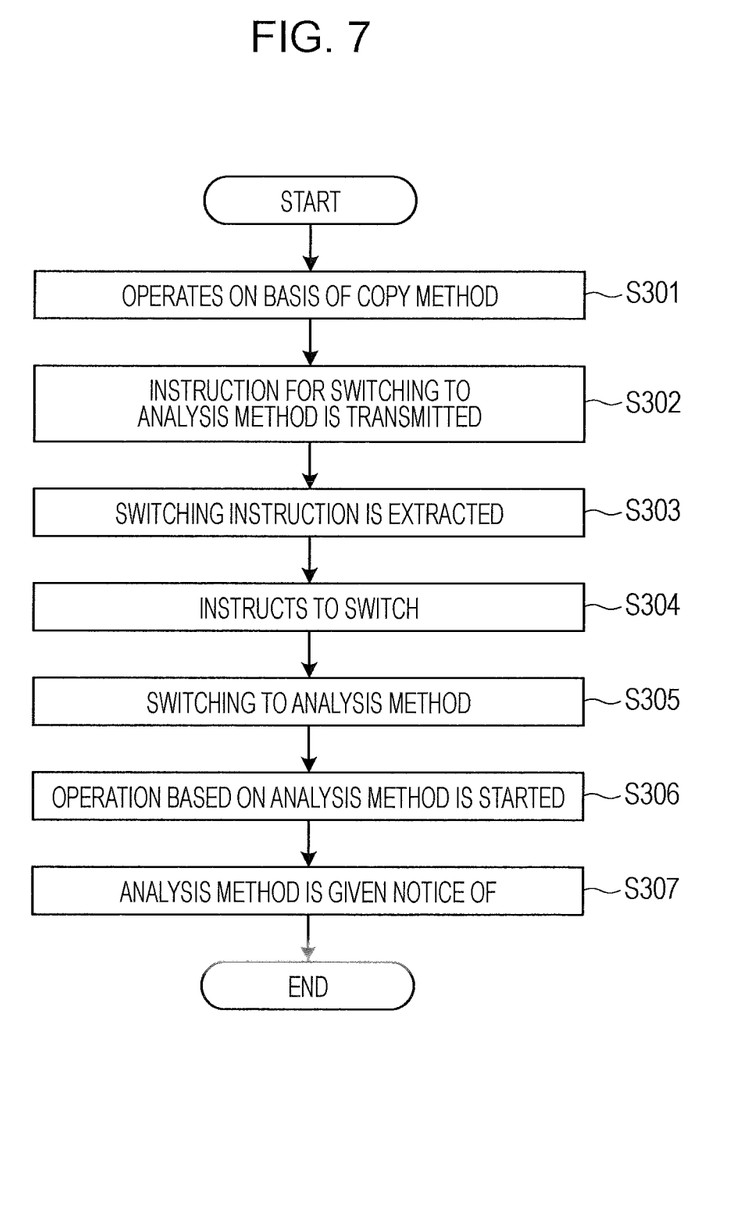
FIG. 7 is a flowchart illustrating processing for switching from the copy method to the analysis method, performed in the information processing apparatus according to the second embodiment.

Next, with reference to FIG. 7, the flow of processing for switching from the copy method to the analysis method will be described that is performed in the information processing apparatus according to the present embodiment. FIG. 7 is a flowchart illustrating the processing for switching from the copy method to the analysis method, performed in the information processing apparatus according to the second embodiment.

The communication controller 102 operates so as to process the mixed data on the basis of the copy method (Operation S301).

The server 2 transmits an instruction for switching to the analysis method (Operation S302).

The processor 105 extracts the instruction for switching to the analysis method, from within the received remote-control data (Operation S303).

Next, the processor 105 notifies the switch controller 110 of switching to the analysis method (Operation S304).

The processor 105 instructs the communication controller 102 to switch to the analysis method, and switches the processing method for the mixed data to the analysis method (Operation S305).

The communication controller 102 operates so as to process the mixed data on the basis of the analysis method (Operation S306).

The response module 107 notifies the server 2 of the completion of switching to the analysis method (Operation S307).

As described above, the information processing apparatus according to the present embodiment has a function for performing processing on the basis of the analysis method in which the mixed data is separated within the remote control communication device and only the application data is transmitted to the OS. Furthermore, it may be possible for the information processing apparatus according to the present embodiment to switch between the analysis method and the copy method, thereby processing the mixed data. In addition, by performing processing on the basis of the analysis method, it may be possible to avoid transmitting, to the OS, an instruction that may cause a problem shaking security to occur, and it may be possible to strengthen security. Here, in the analysis method, since the packaging of the mixed data has been dissolved once and after that, the mixed data is transmitted to the OS after having been subjected to packaging again, a time lag therebetween may occur, and the processing capability of the information processing apparatus may be deteriorated. Therefore, by switching between the analysis method and the copy method, when there is no instruction that may cause a problem shaking security to occur, it may be possible to use the copy method in which communication based on the OS is performed in real time. Therefore, it may be possible to improve the processing capability.

Hardware Configuration

Figure 8:
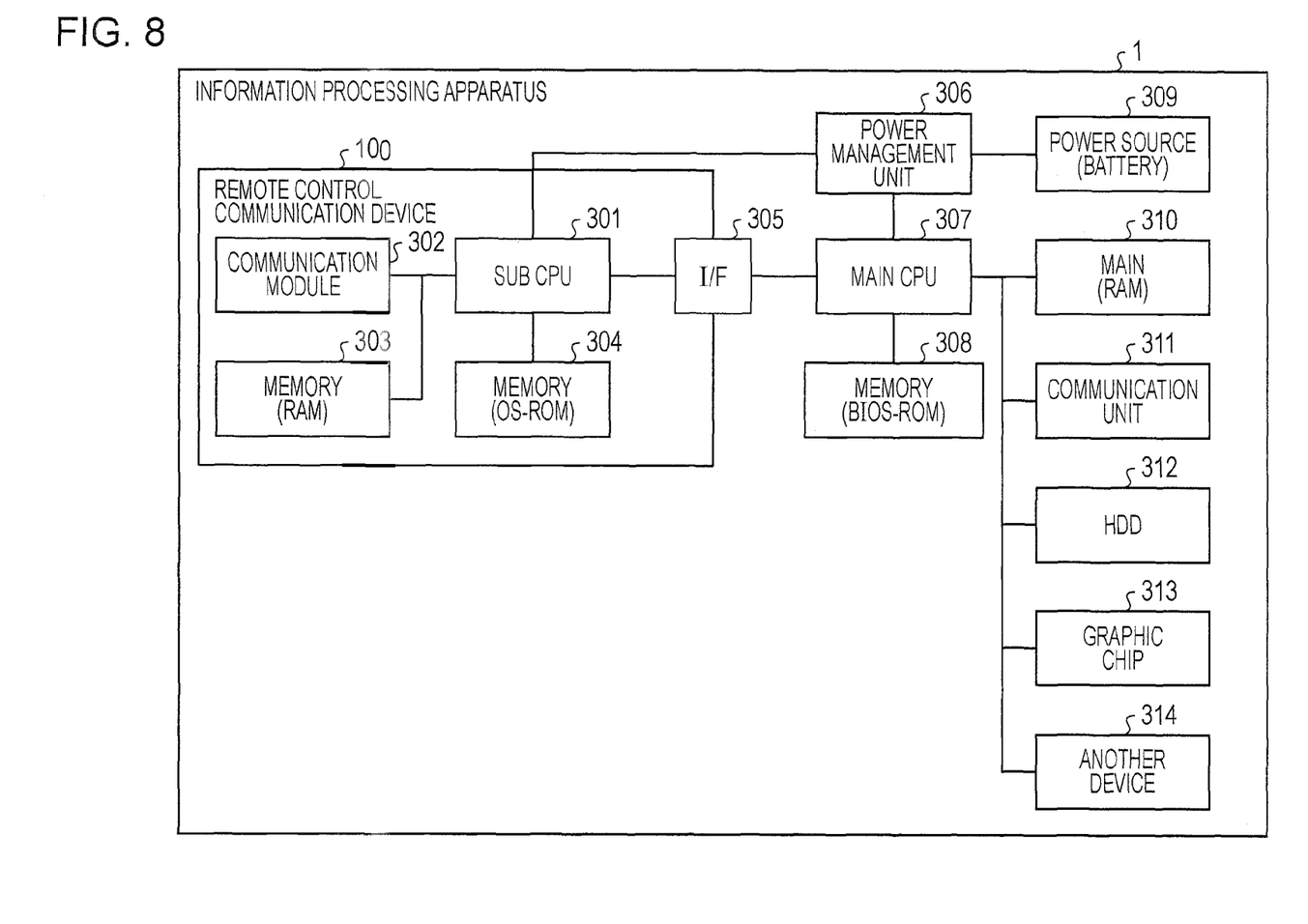
FIG. 8 is a hardware configuration diagram of an information processing apparatus.

Next, the hardware configuration of the information processing apparatus 1 will be described. FIG. 8 is the hardware configuration diagram of the information processing apparatus. As illustrated in FIG. 8, the remote control communication device 100 installed in the information processing apparatus 1 according to each embodiment includes a sub central processing unit (CPU) 301, a communication module 302, a memory (random access memory: RAM) 303, and a memory (OS-read only memory (ROM)) 304. Furthermore, the information processing apparatus 1 includes a power management unit 306, a main CPU 307, a memory (basic input and output system (BIOS)-ROM) 308, a power source (battery) 309, and a memory (RAM) 310. Furthermore, the information processing apparatus 1 includes a communication unit 311, a hard disk drive (HDD) 312, a graphic chip 313, and another device 314.

In the remote control communication device 100, the sub CPU 301 is connected to the communication module 302, the memory 303, and the memory 304. In the memory 304, the OS operating on the remote control communication device 100 is stored. In addition, for example, the communication module 302 is a communication module compatible with the 3G network, and realizes the function of the communication module 101 illustrated in FIG. 1.

The memory 303 realizes the function of the buffer 103 illustrated in FIG. 1. In addition, for example, the sub CPU 301, the memory 303, and the memory 304 realize the functions of the communication controller 102, the processor 105, the extract module 106, the substitute response module 104, and the like, illustrated in FIG. 1. For example, in the memory 303, various kinds of programs are stored that realize processing based on the communication controller 102, the processor 105, the extract module 106, the substitute response module 104 and the like, exemplified in FIG. 1. In addition, the sub CPU 301 reads out and executes these various kinds of programs, and hence a process realizing each of the above-mentioned functions is generated. Here, the sub CPU 301 operates independently from the main CPU 307 of the information processing apparatus 1. Namely, even in a state in which the main CPU 307 does not operate, it may be possible for the sub CPU 301 to perform processing. In addition, power is continuously supplied from the power management unit 306 to the remote control communication device 100. In this regard, however, a power-supply line from the power management unit 306 is not illustrated in the drawing. Furthermore, the sub CPU 301 is connected to the power management unit 306. In addition, it may be possible for the sub CPU 301 to control the power management unit 306 independently from the main CPU 307. Namely, even if the main CPU 307 does not operate, it may be possible for the sub CPU 301 to control the power management unit 306, thereby activating the entire information processing apparatus 1.

The memory 308, the memory 310, the communication unit 311, the HDD 312, the graphic chip 313, and the other device 314 are connected to the main CPU 307. In the HDD 312, the OS and an application are stored. In addition, in the memory 308, the BIOS is stored. The main CPU 307, the memory 310, and the HDD 312 realize the functions of the OS processor 11 and the like, illustrated in FIG. 1, for example. For example, the main CPU 307 reads out and executes the BIOS stored in the memory 308, and activates the OS stored in the HDD 312. In addition, the main CPU 307 reads out a program realizing the processing of the OS processor 11 and the like, from the HDD 312, and executes the program on the activated OS. The communication unit 311 is connected to a network other than the network to which the communication module 302 is connected. For example, the communication unit 311 is connected to a local area network (LAN). The graphic chip 313 causes a monitor or the like to display an image. The other device 314 includes a printer, a monitor, a keyboard, and the like.

The power management unit 306 supplies, to each unit, electric power output by the power source 309. The power management unit 306 supplies power to the main CPU 307, the memory 308, the memory 310, the communication unit 311, the HDD 312, the graphic chip 313, and the like. In this regard, however, a power-supply line from the power management unit 306 is not illustrated in the drawing. In addition, the power management unit 306 is connected to the main CPU 307, and is subject to the control of the main CPU 307.

The main CPU 307 and the sub CPU 301 are connected to each other through an interface (IF) 305. For example, the IF 305 realizes the function of the USB interface 204. In addition, it may be possible for the main CPU 307 and the sub CPU 301 to transmit and receive data to and from each other through the IF 305. For example, the mixed data in the copy method and the application data in the analysis method are transmitted from the sub CPU 301 to the main CPU 307 through the IF 305.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
an operating system (OS) processor configured to process information by using an OS; and
a remote control communication device configured to operate independently from the OS, the remote control communication device including:
    a communication module configured to receive data from an external network,
    a storage module configured to store therein the reception data received by the communication module,
    a communication controller configured to transmit, to the OS processor, the reception data received by the communication module and control the storage module so that the storage module stores therein the reception data,
    an analysis module configured to separate remote-control data and application data, from the reception data after receiving an instruction from the external network to execute the separation,
    an extract module configured to extract, from the reception data stored in the storage module, the remote-control data to be processed in the remote control communication device and configured to extract, from the reception data stored in the storage module, the application data to be processed by the OS processor,
    a processor configured to control the OS processor, based on the remote-control data extracted by the extract module, and
    a reconstitution module configured to transmit, to the OS processor, a packet reconstituted of the application data separated by the analysis module,
wherein the OS processor processes the extracted application data.

2. The information processing apparatus according to claim 1, the remote control communication device further including:
a substitute response module configured to notify the OS processor of communication information used for connection with the external network by the communication module, receive data transmitted by the OS processor using the communication information, and transmit the data to the external network through the communication module.

3. The information processing apparatus according to claim 1, the remote control communication device further including:
a switch controller configured to control the communication controller so as to switch to one of a first processing operation in which the reception data including the remote-control data is transmitted to the OS processor and a second processing operation in which the application data separated from the remote-control data by the analysis module is transmitted to the OS processor, wherein:
the processor controls the OS processor, based on the remote-control data extracted by the extract module, in the case that the first processing operation is selected at the communication controller by the switch controller, and
the processor controls the OS processor, based on the remote-control data separated by the analysis module, in the case that the second processing operation is selected in the communication controller by the switch controller.

4. The information processing apparatus according to claim 3, wherein
upon extracting a switch instruction within the remote-control data extracted from the reception data, the switch controller controls the communication controller so as to switch from one processing operation of the first processing operation and the second processing operation to the other processing operation.

5. The information processing apparatus according to claim 3, the remote control communication device further including:
a response module configured to notify an external device, which has transmitted the remote-control data, of completion of switching when the communication controller has been switched from one processing operation of the first processing operation and the second processing operation to the other processing operation by the switch controller.

6. The information processing apparatus according to claim 3, the remote control communication device further including:
a substitute response module configured to notify the OS processor of communication information used for connection with the external network by the communication module, receive data transmitted by the OS processor using the communication information, and transmit the data to the external network through the communication module.

7. A remote control communication device operating independently from an operating system (OS), in an information processing apparatus including an OS processor configured to process information by using the OS, the remote control communication device comprising:
a communication module configured to receive data from an external network;
a storage module configured to store therein the reception data received by the communication module;
a communication controller configured to transmit, to the OS processor, the reception data received by the communication module and control the storage module so that the storage module stores therein the reception data;
an analysis module configured to separate remote-control data and application data, from the reception data after receiving an instruction from the external network to execute the separation;
an extract module configured to extract, from the reception data stored in the storage module, the remote-control data to be processed in the remote control communication device and configured to extract, from the reception data stored in the storage module, the application data to be processed by the OS processor;
a processor configured to control the OS processor, based on the remote-control data extracted by the extract module; and
a reconstitution module configured to transmit, to the OS processor, a packet reconstituted of the application data separated by the analysis module,
wherein the OS processor processes the extracted application data.

8. A control method to control a remote control communication device operating independently from an operating system (OS), in an information processing apparatus including an OS processor configured to process information by using the OS, the control method comprising:
receiving data from an external network;
transmitting the received data to the OS processor;
storing the received data;
separating remote-control data and application data, from the reception data after receiving an instruction from the external network to execute the separation;
extracting, from the stored data, the remote-control data to be processed in the remote control communication device;
controlling the information processing apparatus, based on the extracted remote-control data;
extracting, from the stored data, the application data to be processed by the OS processor, by a processor; and
transmitting, to the OS processor, a packet reconstituted of the application data separated by the analysis module,
wherein the OS processor processes the extracted application data.

* * * * *